Figure 1:
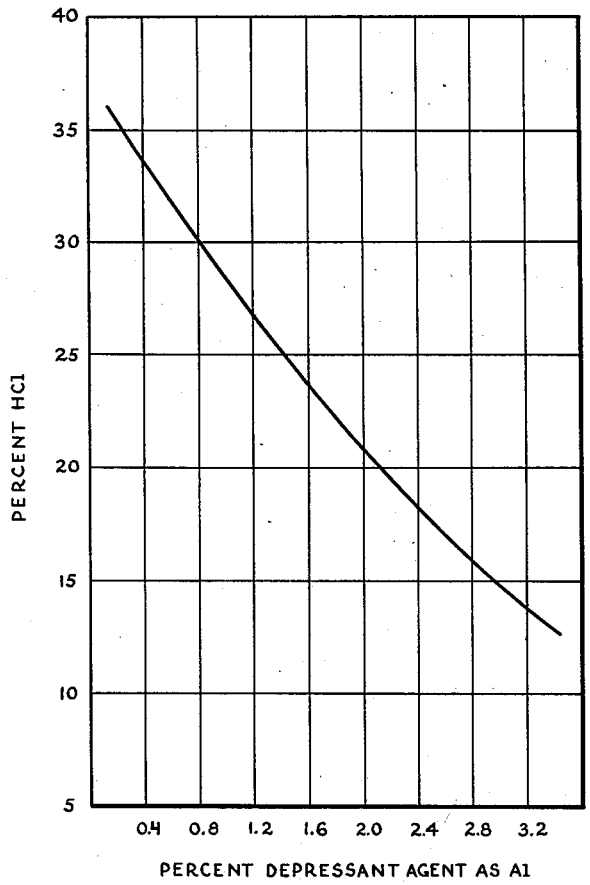

3,079,230
MANUFACTURE OF HYDROCHLORIC ACID UTILIZING ALUMINUM CHLORIDE OR ALUMINUM-CHLORIDE-FLUORIDE COMPLEX AS A DEPRESSANT AGENT

John C. Fedoruk, New Providence, N.J., assignor to Allied Chemical Corporation, a corporation of New York
Filed Sept. 10, 1956, Ser. No. 608,940
17 Claims. (Cl. 23—154)

This invention relates to separation of HCl from mixtures of the same with fluorine compound contaminants soluble in hydrochloric acid.

In industrial processes such as manufacture of chlorofluorocarbons by fluorination of $CCl_4$ with HF, there are produced reaction gases and vapors containing relatively large quantities of by-product HCl and small amounts of fluorine compounds usually in the form of HF and its soluble salts such as $SiF_4$. Economic considerations make HCl recovery important. Recovery of the HCl itself raises no particular problems. However, fluorine contaminants are soluble in HCl and in aqueous solutions thereof and, although fluorine compound content of recovered HCl is relatively low, there is no worthwhile commercial outlet for HCl or hydrochloric acid solutions containing fluorine compounds in amounts normally present in HCl recovered by conventional methods. Hence, reduction of fluorine compound content to acceptably low values presents problems of substantial operating and economic importance.

A major object of this invention is to provide processes by practice of which it is possible to separate HCl from mixtures of the same with fluorine compound contaminants in such a way as to produce HCl or aqueous solutions thereof having very low fluorine content in terms of parts per million. Advantages arising from the herein improvements are such as to afford production of HCl products of sufficiently low fluorine content to adequately meet the rigid requirements for so-called food-grade hydrochloric acid, and also to permit handling of such products in glass or ceramic equipment.

In accordance with the invention it has been found that, with regard to fluorine compounds which are soluble in hydrochloric acid and which are contained as an impurity in a mixture of HCl and a substantially smaller proportion of the fluorine compounds, volatility of fluorine compound impurities may be greatly reduced and minimized by treatment of the mixture of HCl and soluble fluorine compound contaminant with certain fluorine compound depressant agents.

Depressant agents are materials of the group consisting of aluminum chloride ($AlCl_3$) and aluminum-chloride-fluoride complex. In general practice of the invention, HCl is separated from mixtures of the same with hydrochloric acid-soluble fluorine compound contaminants by treating the mixture with a depressant agent in solution in aqueous hydrochloric acid liquor under conditions to effect or maintain volatilization of HCl from the liquor in the treatment zone, net result being that the depressant suppresses volatility of the fluorine compounds to such an extent that, in the best modifications, the HCl leaving the treatment zone in volatile form contains only a few p.p.m. of fluorine on the basis of 100% HCl. All references herein to fluorine compound content in terms of "p.p.m. of fluorine" are on the basis of 100% HCl.

Several feasible procedures for carrying out the invention are available. In one simple illustrative form, a by-product hydrochloric acid solution having an HCl strength of say 30–35% and containing soluble fluorine compound impurities in amount equivalent to say 4000–5000 p.p.m. of F may be introduced into a still along with depressant agent which may be supplied thereto as aluminum chloride in any suitable dry or water solution form. The hydrochloric acid solution is then heated, in the presence of the depressant agent in solution in aqueous hydrochloric acid, to temperature high enough to evolve HCl. At the outset of any operation, particularly batch procedures, probabilities are that the depressant agent is aluminum chloride, but after heating proceeds to any appreciable extent, thereafter the depressant agent is believed to be a mixture of aluminum chloride and an aluminum-chloride-fluoride complex, and probably after some substantial time of operation the depressant agent may be more or less wholly an aluminum-chloride-fluoride complex, possibility being that the complex is or is related to $AlF_3 \cdot 5AlCl_3 \cdot 38H_2O$. Distillation may be continued until HCl has been evolved to such an extent that liquor residue in the still is approximately at or somewhat above the constant boiling composition for that partcular liquor. The still may be provided with a reflux, and according to what may be desired as a product, heat supplied to the still and regulation of reflux may be such as to form a product vapor exit which may vary in HCl composition all the way from substantially anhydrous HCl down to an aqueous hydrochloric acid solution having preferably not more than the equivalent amount of water contained in the approximately constant boiling still bottoms solution, constant boiling point of which may vary in accordance with the depressant agent content. Fluorine impurity constituent of the initial impure hydrochloric acid solution becomes tied up in the depressant agent complex, and the fluorine content of the still overhead is correspondingly reduced.

It has been found that the presence of any appreciable amount of depressant notably suppresses the volatility of the fluorine compound impurities, and hence, in the broader aspects of the invention, treatment or distillation may be carried out in the presence of sufficient depressant to effect retention of any substantial amount of the fluorine compound in association with the aluminum in unvolatilized liquid residue. However, in accordance with all modifications of the invention, particularly where it is desired to recover HCl containing not more than about 300 p.p.m. of fluorine, it has been found that depressant agent should be used in amount equivalent to a soluble aluminum to soluble fluorine weight ratio of not less than about one soluble aluminum to one of all soluble fluorine present. Further, it has been found that in practice of the best embodiments, particularly to obtain product HCl containing not more than about 60 p.p.m. of fluorine, depressant should be used in amount equivalent to a soluble aluminum to soluble fluorine weight ratio of not less than about two soluble aluminum to one of all soluble fluorine present Al/F ratios in excess of about 10/1 afford no operating advantages. Al/F ratios herein are weight ratios and refer to soluble aluminum and soluble fluorine, and do not refer to the aluminum or fluorine of any aluminum-chloride-fluoride complex solids which might form in instances where total depressant agent content exceeds the solubility maximum in the particular hydrochloric acid solution present under the particular conditions of operation. Solubility relationships will be hereinafter discussed.

Temperatures or other conditions of treatment, e.g. temperatures of the liquor in the still pot above, may be anything sufficient to effect or maintain volatilization of HCl from the liquor. However, it has been found that reasonably high treatment temperatures probably promote reaction between depressant and fluorine impurity, and in any event, regardless of reactions possibly involved, reasonably high temperatures promote fluorine impurity extraction and retention of fluorine in association with aluminum. In modifications where it is desired to form products containing less than about 300 p.p.m. of fluorine, heat input in the treating or distillation operation should be such as to heat the liquor, containing the depressant agent and fluorine compound impurities, to temperatures not less than 180° F. (at substantially atmospheric pressure), and for best results it is preferred to heat the liquor to temperatures in the range of about 190–225° F.

In another simple form of practice, aqueous fluorine-free hydrochloric acid of about constant boiling strength, and aluminum chloride may be introduced into the pot of a flash still. A hydrochloric acid solution of e.g. 31% HCl strength and containing fluorine compound impurities corresponding to say 5000 p.p.m. of F may be continuously run into the still. The quantity of depressant agent introduced may be as above stated, or the initial constant boiling solution at the outset may contain a substantial excess of $AlCl_3$ or be supersaturated, since in a batch type operation salting out of depressant agent is of no particular importance. Temperatures of liquor in the pot may be maintained as above indicated, and as before, still heating and reflux conditions may be such as to form a product off-gas containing HCl in amount ranging from substantially anhydrous HCl down to an aqueous HCl vapor corresponding to the constant boiling solution remaining in the still. Appended Examples 1, 2, 4, 5 and 6 demonstrate this type of operation.

According to another modification, a substantially anhydrous gas containing HCl and e.g. 4000–5000 p.p.m. of fluorine impurity, or a similar but hydrous gas containing preferably substantially less $H_2O$ than contained in the constant boiling hydrochloric acid solution, may be bubbled thru an initially fluorine-free say 20% HCl aqueous hydrochloric acid scrubbing liquor, contained in a suitable vessel and to which $AlCl_3$ has been added. Sufficient heat may be applied to the vessel to maintain vaporization of HCl from the surface of the liquor in amount desirably to prevent increase of the HCl concentration of the scrubbing liquor to more than about 33% and preferably in amount substantially equal to the quantity of HCl introduced, i.e. no substantial HCl absorption takes place. Hence, the incoming gaseous mixture of HCl and fluorine compound impurity is heated to a temperature high enough to maintain volatilization of HCl from an aqueous solution of HCl while in the presence of depressant agent in solution in aqueous hydrochloric acid. All during passage of the gas thru the scrubbing liquor, the described Al/F ratios may be maintained in the liquor for example by addition of further amounts of $AlCl_3$ if necessary to keep the ratios up to the values indicated. In a procedure of this type, presence of excess quantities of depressant is not detrimental because possible salting out of depressant is of no importance. Depending upon the nature of the incoming gas, refluxing may be adjusted to produce a substantially anhydrous HCl condenser off-gas or an off-gas which, with respect to HCl and $H_2O$ content, substantially corresponds to the incoming contaminated gas, fluorine being retained in association with the aluminum in the scrubbing liquor. Operation of this type is illustrated in Example 3.

A modification of the foregoing operation may be effected in a scrubbing tower equipped with a gas outlet and an associated reflux condenser at the top, a gas inlet and a tower liquor effluent outlet at the bottom, and suitable recirculation facilities by means of which liquor effluent from the bottom of the tower may be returned to the top thereof. For example, a substantially anhydrous gas containing HCl and fluorine compound impurities may be introduced continuously into the bottom of the tower and contacted countercurrently with downflowing scrubbing liquor which may be e.g. 25% HCl strength hydrochloric acid solution containing depressant agent in amount to provide the Al/F ratios above noted. Additions of depressant may be made to maintain the Al/F ratios during continuous operation. If desired, salting out of depressant agent may be prevented as hereafter described. Scrubbing liquor temperatures, rate of liquor flow and refluxing may be adjusted so that the exit gas of the condenser is of substantially the same composition as the gas entering the bottom of the tower except for greatly diminished fluorine content. Operation of this type is illustrated in Example 7.

In all of the foregoing procedures described, as well as in all modifications of the invention, treatment of a mixture of HCl and fluorine compound contaminants, whether such mixture is initially in the form of a liquid or a gas, is carried out in a treatment zone under conditions to effect or maintain volatilization of HCl from the surface of an aqueous solution of hydrochloric acid in the treatment zone and containing the depressant agent in solution, such volatilization being effected by an adequate degree of applied heat. Preferably, all the hydrochloric acid liquors carrying depressant in solution have an HCl strength not less than that of the constant boiling composition. In modifications involving straight distillation, temperatures are inherently high enough to maintain volatilization of HCl from the surface of the liquor in the treatment zone or still. In gas scrubbing operations, which are less preferred embodiments, temperatures preferably are high enough to prevent any substantial HCl absorption and hence are high enough to maintain volatilization of HCl from the surface of the scrubbing liquor.

Experience has shown that, in continuous operations, conditions may become such that depressant agent tends to salt out, causing undesirable plugging of apparatus. It has been found that salting out is caused by the presence of too great a quantity of depressant agent for the specific HCl strength of the liquor at a particular operation, and that, when prevention of salting out is desirable, depressant content as aluminum should not exceed certain values depending upon the HCl strength of the hydrochloric acid liquor carrying the depressant agent. In preferred modifications, especially those embodying large-scale commercial operations, HCl strength of hydrochloric acid liquors used is in the range of from a little above the HCl strength of the constant boiling HCl-$H_2O$ system under the depressant agent content conditions up to about 33% HCl concentration. As depressant agent content in the liquors increases from about zero to about 2.4% by weight as Al, constant boiling composition may vary fairly proportionally from about 20% HCl down to about 11–13% HCl. Preferably, HCl strength of the hydrochloric acid liquor used lies in the range of about 18–33%. Investigations indicate that the greater the HCl content, the less the solubility of the depressant agent, and practice shows that for an HCl strength of about 18%, depressant agent content as Al should be not more than an equivalent aluminum value of about 2.4%, and for an HCl strength of about 33%, depressant agent should not exceed an equivalent aluminum value of about 0.4%. Thus, when prevention of salting out of depressant agent is desired, the depressant agent content as Al should be not in excess of an equivalent aluminum value decreasing substantially proportionally to about 2.4% for about 18% HCl solution strength to about 0.4% for about 33% HCl solution strength. The curve of FIG. 1 of the attached drawings shows approximate maximum solubility of depressant agent content as Al in aqueous hydrochloric acid solutions of various HCl strengths, at temperature of about 85° F., a temperature which is about as low as any liquor temperature normally encountered in practice.

Figure 2:
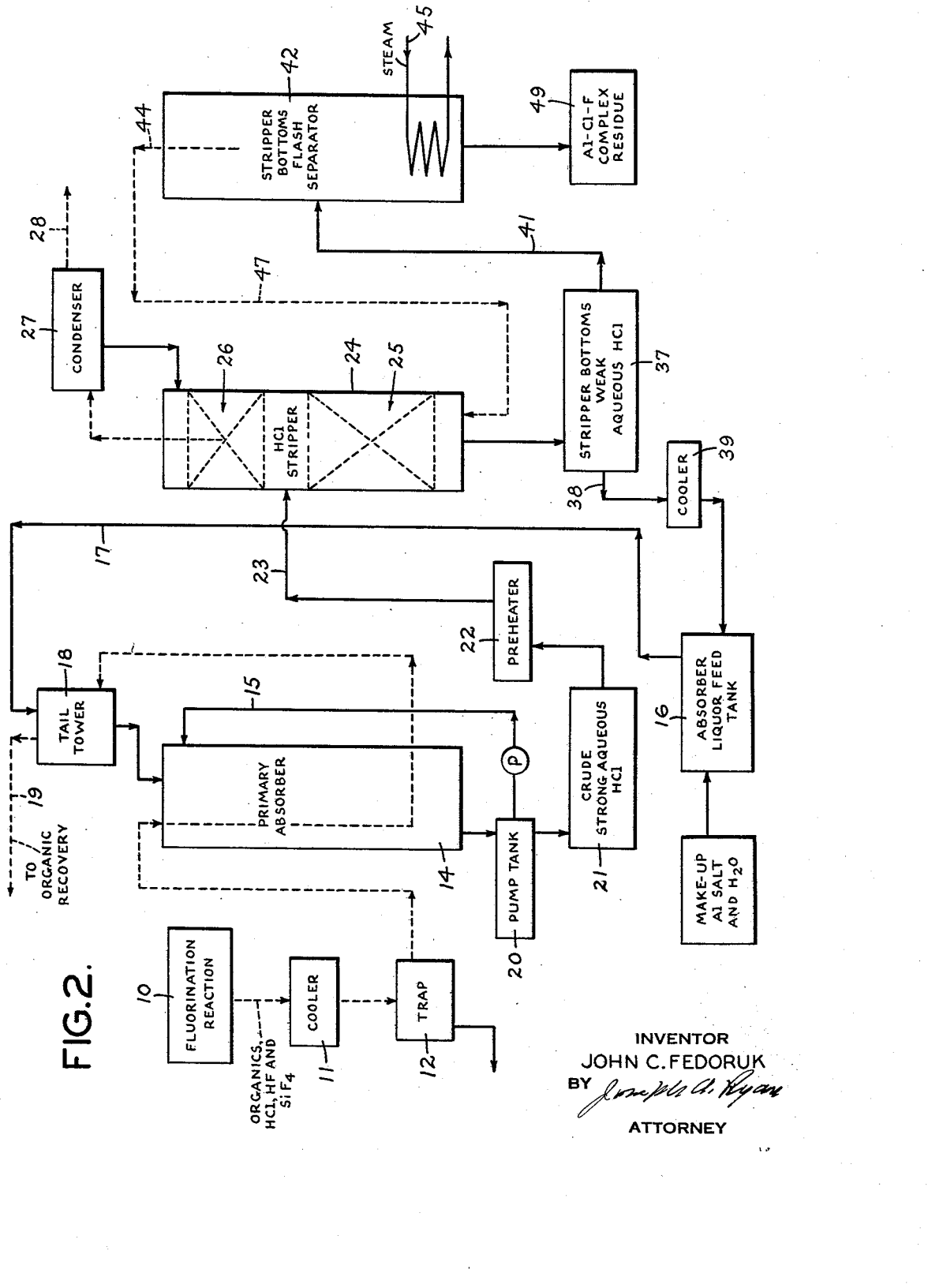

FIG. 2 illustrates diagrammatically a preferred modification, suitable for large-scale commercial operation. Numeral 10 indicates a known fluorination process in which, by reaction of $CCl_4$ and HF, there is produced an off-gas comprising organics, e.g. $CCl_2F_2$ and $CCl_3F$, a substantial quantity of HCl, a relatively small amount of HF, and possibly some fluorine in the form of $SiF_4$. Such gas may be cooled to e.g. 75–100° F. in cooler 11, and passed into a trap 12 in which unreacted $CCl_4$ and possibly some $CCl_3F$ are separated out of the gas stream.

Gas exiting trap 12 is passed into a primary absorber 14 of any suitable known construction adapted to effect absorption of HCl gas in aqueous hydrochloric acid liquor. The absorber may be arranged for counter or co-current gas-liquor flow, preferably the latter, a particularly suitable absorber being of the falling film type shown in Hunter U.S.P. 2,559,720 of July 10, 1951.

In absorber 14, the gas stream may be contacted co-currently with hydrochloric acid liquor from absorber recirculation system 15 and with an incoming aqueous initially relatively weak HCl solution from absorber liquor feed tank 16 arranged to supply liquor thru conduit 17 to the tail tower 18 of absorber 14. In accordance with the invention, liquor run into the top of tower 18 from conduit 17 includes the fluorine compound depressant agent. Off-gas of absorber 14 conducted into and thru tail tower 18, and thence into an outlet conduit 19 which conducts the gas stream, substantially denuded of HCl and fluorine, to a process, not shown, for recovery of organics.

Liquor effluent of absorber 14, overflowing pump tank 20 and collecting in tank 21, is an aqueous substantially stronger HCl solution containing depressant agent, and HCl and fluorine compounds abstracted from the gas stream during passage through the absorber. Preferably, liquor drawn off from tank 21 is heated in a preheater 22, and thereafter is introduced by conduit 23 into a fractionating column or HCl stripper 24, affording a stripping section 25 and an enriching section 26, and provided with conventional condenser and reflux equipment 27. The stripper and condenser-reflux may be designed and operated as known in the art so as to provide in line 28 a condenser off-gas which may be either substantially anhydrous HCl or HCl containing variable amounts of water. This off-gas, a product of the invention, is characterized by low fluorine content, and may be utilized in any manner desired, e.g. substantially anhydrous HCl as such or for the production of high or any strength hydrochloric acid by conventional methods and equipment.

Fractionating tower bottoms collecting in tank 37 are aqueous liquors having an HCl strength about or little above the HCl content of the constant boiling hydrochloric acid solution existing under the prevailing conditions of operation, and containing aluminum chloride, aluminum fluoride and possibly some silicon, the fluorine all thought, at this stage of operation, to be tied up as the indicated aluminum-chloride-fluoride complex. Bulk of the liquor collected in tank 37 is returned thru line 38 and cooler 39 to the primary absorber via liquor feed tank 16 and line 17. For the purpose of maintaining low fluorine levels in final products and for eventually removing from the system the fluorine of the HF and any $SiF_4$ contained in the gas stream entering absorber 14, a certain amount of liquor is withdrawn from tank 37 and transferred thru line 41 into a flash separator 42 provided at the top with a gas off-take 44 and at the bottom with a reboiler indicated by steam coils 45. Operation of separator 42 is such as to flash off most of the HCl content of the liquor fed thereto as an $HCl-H_2O$ vapor or gas having substantially the composition of the constant boiling $HCl-H_2O$ system, i.e. about 20–21% HCl strength. The hot off-gas of still 42 may be condensed and returned to the primary absorber, but preferably is conducted by conduit 47 into the bottom of stripper 24 to facilitate maintenance of the hereindescribed operation of the stripper. The residue bottoms, discharged from still 42 into a collecting vat 49, may run 25–40% as $AlCl_3$ by weight of probably all aluminum-chloride-fluoride complex, the balance being water and possibly 2–5 percent of HCl.

The gas mixture containing HCl and fluorine compound contaminant fed into the top of absorber 14 may be from any source. Preferably this gas is relatively anhydrous, although gases containing some appreciable amounts of water may be employed. As a practical matter, if the gas contains water, water content, to permit absorption of all HCl, should not be in excess of an amount which if combined with all the HCl present would form an $HCl-H_2O$ mixture containing less than about 80% water. With respect to HCl, the gas stream should contain a substantially smaller proportion of fluorine compound contaminants. Absorption operation may be in accordance with known practice, and absorbing temperature and rate of liquor flow over absorber 14 are controlled so as to absorb substantially all of the HCl out of the incoming gas, fluorine compound impurities being simultaneously absorbed. Temperatures at the top of tail tower 18 may be in the range of 75 to 120° F., and temperatures at the top of absorber 14 may lie in the range of 120 to 160° F. at substantially atmospheric pressure. Temperatures of liquor effluent from the bottom of absorber 14 may lie in the range of 75–100° F., with a preferred maximum temperature of about 90° F.

In a continuous operation, depressant agent containing extracted fluorine is continuously discharged from the system and depressant agent make-up is continuously introduced as into absorber liquor feed tank 16, into which the major part of the bottoms from stripping tower 25 are fed thru a cooler 39. Depressant may be introduced as metallic aluminum, or any aluminum compound such as aluminum hydrate which is soluble in hydrochloric acid. Usually, depressant agent is supplied in the form of a 26% $AlCl_3$ strength aqueous solution of aluminum chloride. In instances where aluminum is fed into the process in any form other than aluminum chloride, aluminum chloride is formed eventually after introduction of the aluminum or aluminum compound into the hydrochloric acid liquor in the system.

Two features of major importance for control of the absorption operation are the HCl strength and the depressant agent content of the liquor fed into the absorption system from recycle line 17. Depressant agent considerations involve two factors—the presence in the system of a sufficient amount of depressant agent as aluminum to provide the above indicated Al/F ratios in the effluent liquor discharged from absorber 14 and subsequently charged into stripper 24, and the absence in such liquor of depressant agent in an amount which causes undesirable salting out of depressant agent, maximum Al content in turn, as previously noted, being dependent upon the HCl strength of the liquor discharged from the bottom of absorber 14. The preferred modification involves forming, e.g. as collected in crude strong aqueous hydrochloric acid tank 21, an aqueous hydrochloric acid solution containing as impurity soluble fluorine compound in amount equivalent to much in excess of 300 p.p.m. of fluorine, said solution (1) having an HCl strength in the range of about 18–33%, (2) containing fluorine depressant agent in amount equivalent to a soluble aluminum to soluble fluorine weight ratio of not less than one and preferably not less than two soluble aluminum to one of all soluble fluorine present, and (3) having said depressant agent content not in excess of an equivalent aluminum value decreasing substantially proportionally from about 2.4% for about 18% HCl solution strength to about 0.4% for about 33% HCl solution strength.

In typical operation, stripper bottoms collecting in tank 37 may have an HCl strength which may be about 18–21%, and may have Al/F ratios of about 2.4/1 to 3/1, and may contain as much as about 1.2% depressant agent as Al. After introduction into recycled stripper bottoms of incoming make-up depressant agent, liquor fed in the absorption system from line 17 may then have an HCl strength in the range of about 18–21%, and may contain a preferred maximum of about 1.2% of Al, Al/F ratios rising to above 3/1. Because of decreasing depressant agent solubility as HCl strength rises, in typical practice it is preferred to operate the absorption system so that the liquor discharged from the bottom thereof contains not more than about 30% HCl in which instance, to avoid salting out of depressant agent, the Al content should not exceed about 0.7% Al. With this factor in mind, if salting out is to be avoided, the quantity of make-up aluminum chloride added to the liquor recycled to absorption thru recycle pipe 17 should in any case be adjusted so that the liquor collecting in strong HCl storage tank 21 contains not more than about 0.7% of Al for a 30% HCl strength liquor. For other preferably lower HCl strengths in tank 21, permissible maximum Al contents may be determined by consideration of the curve of FIG. 1. It will be understood that because of volume increase during absorption and the greater Al solubility of the lower HCl strength liquors fed to the absorption system, recycle liquor fed to absorption may and does have a higher Al content than the liquor collected in tank 21.

The immediately above discussed typical stripper bottoms collecting in tank 37 have an Al/F ratio usually not less than one soluble aluminum to one soluble fluorine, preferably not less than two, these ratios being needed for fluorine extraction to desired levels. It will be understood that in any given operation the Al/F ratio of stripper bottoms is about the same as or possibly a little lower than the Al/F ratio of the liquor collected in tank 21 and fed into the stripper thru line 23. Addition of make-up AlCl₃ to liquor recycled to absorption raises the Al/F ratio, and on the other hand, during absorption, because of fluorine pick-up, the Al/F ratio decreases. For example, when working with a stripper feed having an Al/F ratio of say 2.6/1, stripper bottoms have substantially the same or possibly slightly lower ratio, and the amount of AlCl₃ introduced into the recycled liquor may be such as to increase the Al/F ratio of the liquor fed to absorption to about 3/1, i.e. an amount such that the liquor discharged from the bottom of the absorber 14 has the desired working Al/F ratio of about 2.6/1. Hence, it will be understood that the amount of AlCl₃ introduced into recycle liquor is such, depending upon the fluorine impurity content of the incoming gas, as to provide in absorption effluent liquor the desired Al/F ratio.

In the better forms of large-scale commercial procedures, it is preferred to operate so that liquor as collected in tank 21 and as fed into stripper 24 contains Al in amount which is just practicably short of maximum Al solubility for the HCl strength of the particular liquor in use, i.e. a condition at which depressant agent will not salt out, the liquor is at its approximately maximum fluorine-carrying capacity, and the necessity for bleeding fluorine out of the system becomes imminent. Hence, adjustment of input of make-up AlCl₃ to liquor being recycled to absorption is preferably such as to maintain approximately maximum quantities of Al in the liquor collecting in tank 21 without exceeding Al solubility limits. Ordinarily, incoming gases have an impurity content as fluorine which is low with respect to HCl, a typical gas of the character under discussion containing fluorine impurity in the range of about 3500–7500 p.p.m. of F, basis 100% HCl. When using relatively low fluorine gases of this nature, and when proceeding as indicated so as to maintain practicable maximum amounts of soluble Al in the liquor in tank 21, provision of enough make-up AlCl₃ to maintain such maximum soluble aluminum values automatically takes care of maintenance of Al/F ratios. However, to avoid situations in which so much make-up aluminum is required to provide Al/F ratio maintenance as to get too close to or exceed Al/F solubility limits, it is preferred to employ incoming gases which contain fluorine compound contaminants amounting to less than about 15,000 p.p.m. of F, 100% HCl basis. Should gases to be treated contain appreciably more than 15,000 p.p.m. of F, it is preferred to interpose between trap 12 and absorber 14 a scrubbing pot step, the same in principle as illustrated in Example 3, to preliminarily treat the incoming gas stream to reduce F content to below about 15,000 p.p.m., 100% HCl basis.

Liquor collected in tank 21 is next subjected to distillation under conditions to strip out the HCl absorbed in the circulating liquors during passage of the same thru the absorption system. To effect distillation in a stripper of the type illustrated in the drawing, liquor from tank 21 is preheated sufficiently to provide feed liquor to stripper 24 heated to temperature not less than about 180° F., preferably not less than about 200° F. Such liquor is fed into stripping tower 24 preferably above the vertical mid-point, i.e. at a point where internal tower temperatures approximately correspond to the temperature of inflowing liquor. Whatever may be the specific mode of distillation, as in other modifications of the invention, temperature conditions in tower 24 should be such that all the liquor therein is heated to temperature not less than about 180° F., particularly when it is desired to produce HCl product containing less than about 300 p.p.m. of F, and preferably maintained at a temperature of the order of 190–225° F., especially when it is desired to make products containing not more than about 60 p.p.m. of F. In the distillation column illustrated, heat is supplied thereto as preheat of incoming liquor to be stripped and as sensible heat of an HCl vapor introduced into the bottom of the column from line 47 as will be subsequently described.

In typical operations, temperatures at the upper end of stripping zone 25 may be maintained in the range of about 190–210° F., and temperatures in the bottom of the column may be in the range of about 220–225° F. When it is desired to produce a substantially anhydrous HCl exit from condenser 27, condenser cooling is such as to maintain temperatures of about 100° F. maximum at the gas exit of the condenser, and refluxing conditions are adjusted so as to keep temperature in the upper end of enriching section 26 of tower 24 in the range of about 180° F. maximum. While other pressures may be employed, the stripping column preferably is operated at substantially atmospheric pressure, temperatures noted being on this basis. If it is desired to produce an aqueous HCl condenser exit, condenser exit temperatures and refluxing conditions may be adjusted to form a condenser exit containing H₂O in amounts from just below anhydrous down to an HCl—H₂O mixture containing water in quantity preferably say 1–3% above the H₂O content of the substantially constant boiling bottoms of the stripper. In production of the aqueous condenser exits, maximum top column temperatures in the stripper should be about 220° F. at atmospheric pressure.

The substantially anhydrous HCl exiting condenser 27 may be utilized as desired, e.g. as substantially anhydrous HCl, or the HCl may be utilized as known in the art to form say 20° Bé. hydrochloric acid.

When working with say a 30% and preferably less HCl strength liquor feed to stripper 24, when F content thereof approaches about 0.4%, it is necessary to bleed out fluorine and remove the same from the system to maintain the desired low fluorine level in the products. For this purpose in a representative operation, a 10–20% volume proportion of liquor collecting in stripper bottoms tank 37 may be conducted at temperature thereof thru line 41 into stripper bottoms flash separator 42 equipped at the bottom with heating facilities and at the top with a gas offtake 44. In this separator, liquor drawn from stripper bottoms tank 37 is heated to temperature high enough to drive off most of the HCl and separate the same from the aluminum and associated chloride and fluoride. Dependent upon HCl tolerance in the separator bottoms, heat input to the separator may be such as to maintain internal temperatures in the range of about 225–250° F. at substantially atmospheric pressure, usual operating temperature being of the order of 240–245° F. The HCl content of the separator feed is vaporized out as an aqueous HCl vapor having an HCl content corresponding approximately to that of the constant boiling HCl—H₂O system, i.e. 20–21% HCl and containing about 100–300 p.p.m. of F. Separator overhead vapor temperatures may be in the range of 240–245° F., and such vapor is returned thru line 47 to the bottom of stripper 24 to recover the HCl and utilize the sensible heat thereof to supply the balance of heat needed in stripper 24. The bottoms of separator 42 constitute the process tailing which, at the temperature of operation, is an aqueous solution which may contain up to 2% HCl and contain 5–7% complex as Al, and have an Al/F weight ratio of 2.4–3.

Following examples illustrate practice of various phases of the invention. Percentages are by weight, parts per million (p.p.m.) of fluorine are on an anhydrous HCl basis, and Al/F ratios are weight ratios and refer to aluminum and fluorine both in solution.

*Example 1.*—10 grams of AlCl₃ as the six water crystal were added to about 500 ml. of about 20% strength aqueous hydrochloric acid solution containing no fluorine in a glass flash pot still equipped with a reflux condenser and heating facilities. About 500 ml. of 31.5% HCl strength by-product hydrochloric acid solution containing 0.147% (about 4666 p.p.m.) of fluorine were added continuously by means of a dropping funnel. Sufficient heat was applied to maintain an approximately constant pot level, and a pot liquor temperature of about 230° F. Reflux condenser gas offtake was maintained at a temperature of about 100° F., i.e. distillation conditions were such as to produce substantially anhydrous HCl at the gas outlet of the condenser. Al/F ratio with respect to all of the fluorine fed to the still was about 2.35/1. The substantially anhydrous HCl discharged from the condenser was absorbed in water under known conditions ot produce a 20° Bé. hydrochloric acid solution. Analysis showed that this product contained about 51 p.p.m. of F.

*Example 2.*—Distillation procedure, and apparatus except for being made of "Karbate," were otherwise substantially the same as in Example 1. 20 grams of AlCl₃ were initially added to about 500 ml. of fluorine-free, approximately 20% strength hydrochloric acid solution in the flash pot still. About 700 ml. of 31.5% HCl strength by-product hydrochloric acid solution containing 0.147% (about 4666 p.p.m.) of fluorine were added dropwise. Pot liquor temperature was held at about 220–230° F. and the gas offtake of the reflux condenser was maintained at about 90–100° F. Al/F ratio with respect to all the F introduced during the run was 3.3/1. The substantially anhydrous HCl offtake of the reflux was absorbed in water to produce 20° Bé. hydrochloric acid solution. This product contained about 35 p.p.m. of F.

*Example 3.*—In a glass flash pot still equipped with a reflux condenser and heating facilities, a body of about 500 ml. of about 20% strength aqueous hydrochloric acid and containing no fluorine but supersaturated with AlCl₃ was held at a pot liquor temperature of about 220–230° F. A stream of substantially anhydrous crude gas, from fluorination of CCl₄ with HF, containing organics such as CCl₂ and CCl₃F, and containing about 60 volume percent of HCl and about 3000 p.p.m. of fluorine on basis of all the HCl present was bubbled thru the scrubbing liquor, temperature of which was high enough to prevent any substantial absorption of HCl. Reflux condenser gas offtake was maintained at temperature of about 90–100° F., i.e. scrubbing and refluxing conditions were such as to produce a substantially anhydrous HCl at the condenser gas exit. Al/F ratio with respect to all introduced fluorine was above 3/1 throughout the run. The substantially anhydrous HCl discharged from the reflux condenser was absorbed in water under known conditions to produce a 20° Bé. hydrochloric acid solution. Analysis showed that this product contained about 182 p.p.m. of F. Organics passed out of the final absorber as overhead.

*Example 4.*—In a series of below summarized runs, hydrochloric acid solutions of various hydrochloric acid strengths and fluorine contents, and treated with amounts of AlCl₃, to afford fairly comparable Al/F ratios were added at a rate of about 200 ml./hr. to a flash pot still constructed and operated substantially as in Example 1. In each of these runs, the flash pot initially contained a hydrochloric acid solution heel of a previous run. Data were not taken until equilibrium was established. In each run, the substantially anhydrous HCl exit of the reflux condenser was absorbed in water under conditions to form a 20° Bé. hydrochloric acid product. Data of these runs are as follows:

| Feed acid: | | | | | |
|---|---|---|---|---|---|
| Weight percent F | .16 | .45 | 1.00 | 1.50 | 1.94 |
| Weight percent HCl | 30.51 | 26.06 | 18.85 | 10.70 | 5.96 |
| Weight percent AlCl₃ | 1.83 | 4.99 | 12.0 | 18.0 | 23.3 |
| Al/F weight ratio | 2.38 | 2.26 | 2.42 | 2.42 | 2.42 |
| P.p.m. F, anhydrous HCl basis | 5,244 | 17,229 | 53,050 | 140,186 | 325,503 |
| Bottoms acid: | | | | | |
| Weight percent F | .15 | .52 | .97 | 1.54 | 2.01 |
| Weight percent HCl | 20.66 | 17.90 | 11.34 | 5.58 | 2.08 |
| Product acid: | | | | | |
| 20° Bé. HCl strength— p.p.m. F, anhydrous HCl basis | 43 | 58 | 54 | 45 | 35 |

NOTE:
Pot liquor temp: 220–245° F. for all runs.
Condenser exit temp: 90–100° F. for all runs.

*Example 5.*—Procedurally, this run was similar to those of Example 4 except that all fluorine present was introduced as H₂SiF₆. Feed acid analyzed 18.65% HCl, 13.5% AlCl₃, and 1.13% F (about 60,000 p.p.m. of F). At the start the flash pot was charged with about 500 ml. of 20% HCl solution containing no F. Pot liquor temperature was held at about 220–230° F. and the condenser gas offtake was maintained at about 90–100° F., i.e. distillation conditions were such as to produce substantially anhydrous HCl. Al/F ratio with respect to all the fluorine fed to the still was about 2.7/1. The substantially anhydrous HCl discharged from the reflux condenser was absorbed in water to produce a 20° Bé. hydrochloric acid solution which contained about 84 p.p.m. F. Bottoms acid analyzed about 10.9% HCl and 1.22% F.

*Example 6.*—In another series of runs, hydrochloric acid solutions, each containing about 31.8% HCl and about 0.12% F and treated with amounts of AlCl₃ to afford varying Al/F ratios, were added at a rate of about 200 ml./hr. to a flash pot still constructed and operated substantially as in Example 4. In each run, the flash pot initially contained about a 500 ml. heel from a previous operation. In each run, the substantially anhydrous HCl exit of the condenser was absorbed in water under conditions to form a 20° Bé. hydrochloric acid product. In all runs, pot liquor temperature was about 220–230° F. and condenser exit temperature was about 90–100° F. Data of these runs, taken after equilibrium was established, are as follows:

| Feed acid: | | | | |
|---|---|---|---|---|
| Al/F weight ratio | 1.02 | 1.02 | 1.51 | 2.1 |
| P.p.m. F, anhydrous HCl basis | 3,775 | 3,775 | 3,775 | 3,775 |
| Product acid: 20° Bé. HCl strength— p.p.m. F, anhydrous HCl basis | 143 | 127 | 38 | 19 |

*Example 7.*—A 3 inch I.D., 18 ft. high scrubbing tower packed with ¼" carbon rings was employed. The tower was equipped at the top with a reflux condenser, a gas inlet and a liquor outlet at the bottom, a sump-pump-pipe system to recirculate liquor withdrawn from the bottom of the tower back over the top of the tower, and with external heating facilities to regulate temperatures within the tower. At the start of operation the system was filled with aqueous hydrochloric acid of about 26% HCl strength and containing in solution aluminum chloride in amount equivalent to 0.67% Al and about 1490 p.p.m. of F, i.e. Al/F ratio of about 4.5/1. Gas charged into the tower bottom was anhydrous crude gas, from fluorination of $CCl_4$ with HF similar to the crude gas of Example 3, containing organics such as $CCl_2F_2$ and $CCl_3F$, and containing about 55–60 volume percent of HCl and about 4800 p.p.m. F. Gas feed was at a rate of about 0.27 cu.ft./sec., and liquor feed rate to the top of the tower was about 1 gallon/sq. ft. of tower cross-sectional area. Rate of liquor feed over the tower and external heating thereof were such as to maintain temperature of about 200–210° F. at the top of the tower, and a liquor effluent temperature at the bottom of the tower of about 230° F. Operation was continued for about 9 hours. Throughout the operation, by further addition of $AlCl_3$ when needed, the ratio of Al/F with respect to all fluorine present, i.e. the fluorine initially present in the circulating liquor plus the fluorine abstracted from the incoming gas stream, was maintained above about 3/1, and the percent Al in the system did not exceed about 0.8% with the result that there was no salting out during the run. Gas offtake of the condenser was held at about 90–100° F., i.e. scrubbing and refluxing conditions were such as to maintain volatilization of HCl from the surface of the liquor in the tower and such as to produce substantially anhydrous HCl at the gas exit of the condenser. It will be understood that because of the anhydrous conditions maintained at the exit of the condenser and relatively high temperature of the liquor in the tower, substantially no HCl absorption was effected, and HCl strength of hot liquor in the tower remained substantially constant with the net result such that the gas leaving the condenser was substantially the same in composition as the gas entering the bottom of the tower except for fluorine extracted from the gas stream during passage thru the tower countercurrent to the downflowing hydrochloric acid liquor. During the course of the run, separation of HCl and fluorine was such that the condenser exit gas contained substantially in the range of 80–160 p.p.m. of F, basis anhydrous HCl.

*Example 8.*—Operation and apparatus were generally similar to those illustrated in the drawing. Incoming gas charged, at temperature of about 90–100° F. into the top of a falling film type absorber 14 from trap 12 was similar to the gas of Examples 3 and 7 and contained, besides organics, about 60 volume percent of and about 5320 p.p.m. of F, anhydrous HCl basis. When continuous operation was under way, liquor fed at temperature of about 80–90° F. into the top of a packed tail tower 18 from line 17 contained about 19–20% HCl, about 1.0% Al, about 0.32% F, i.e. an Al/F ratio of about 3/1, all aluminum salt being in solution. The organic off-gas of tower 18 contained substantially no HCl and was at temperature of about 90–100° F. Rate of liquor flow downwardly thru the absorber and external cooling thereof were such that there was discharged from the tower bottom an aqueous hydrochloric acid liquor, at temperature of about 90–100° F., and containing about 28.5% HCl, 0.94% Al, about 0.36% F, i.e. an Al/F ratio of about 2.6, all aluminum salt being in solution. Such liquor was preheated as in a preheater 22 and fed at temperature of about 200–210° F. into approximately the bottom of the top third of a conventionally packed stripping tower such as 24. Temperature in a stripping section 25 was maintained at about 225° F. at the bottom of the column, and about 220° F. at approximately the top of the stripping section. At about the top of an enriching section 26 (approximately the top of the stripper as a whole) temperature was about 200–210° F. The stripping tower was operated at substantially atmospheric pressure, with a pressure drop across the tower of about 6 inches of water. Liquor discharged from the stripper bottom and collected as in a tank 37 was at temperature of about 225° F. and contained about 19–20% HCl, and had Al/F ratio of about 2.6/1. There was no salting-out of aluminum chloride-fluoride complex. Most of the liquor continuously collecting in tank 37 was cooled to about 90–100° F. and recycled to tail tower 18 of primary absorber 14. $AlCl_3$ was added continuously as a 30% water solution to the tail tower 18 feed to maintain an Al/F ratio in the stripper feed of about 2.6. To bleed fluorine out of the system, the balance of the liquor in the stripper bottoms tank was continuously heated to the boiling point in a reboiler to a temperature of approximately 245° F. The vapor-liquid mixture at the boiling point was passed into a separator from the top of which was discharged a hydrochloric acid vapor containing about 20–21% HCl and a relatively small amount of fluorine, less than 300 p.p.m., 100% HCl basis. The vaporous effluent of the separator, at temperature of about 230° F., was returned to the bottom of the stripper to recover the HCl content and utilize the sensible heat thereof to facilitate maintenance of temperature conditions in the stripper. It will be understood that heat utilized in the stripper was heat provided by the preheat of incoming liquor to be stripped and by the sensible heat of the HCl vapor introduced into the bottom of the column from the separator. Fluorine to be discharge from the system was retained as a constituent of a condensate collecting as tailings in the bottom of the separator, which condensate was a solution at the temperature of separator operation. In this run, the tailings contained about 6.8% aluminum, 2.3% F, about 0.8% HCl, Al/F ratio being about 3. The gas exit of the stripper reflux condenser was maintained at temperature of about 90–100° F., i.e. stripper distillation conditions were such as to recover HCl as the substantially anhydrous product. Over a continuous run of about 48 hours, the exit product of the condenser averaged about 99% plus HCl, and had an average fluorine content of about 16 p.p.m.

I claim:

1. The process of depressing the volatility of a fluorine compound which is soluble in hydrochloric acid and which is contained as an impurity in a mixture of HCl and a smaller proportion of said fluorine compound to effect separation of HCl from said compound which process comprises contacting said mixture in a treatment zone with a depressant agent in solution in aqueous hydrochloric acid liquor, and maintaining volatilization of HCl from the liquor in said treatment zone, said depressant agent being material of the group consisting of aluminum chloride and aluminum-chloride-fluoride complex and being present in amount sufficient to effect retention of a substantial amount of fluorine of said fluorine compound in association with aluminum in unvolatilized liquid residue.

2. The process of depressing the volatility of a fluorine compound which is soluble in hydrochloric acid and which is contained as an impurity in a mixture of HCl and a smaller proportion of said fluorine compound to effect separation of HCl from said compound which process comprises heating said mixture in a treatment zone, while in the presence of a depressant agent in solution in aqueous hydrochloric acid liquor, to temperature high enough to effect volatilization of HCl from the liquor in said treatment zone, said depressant agent being material of the group consisting of aluminum chloride and aluminum-chloride-fluoride complex and being present in amount sufficient to effect retention of a substantial amount of fluorine of said fluorine compound in association with aluminum in unvolatilized liquid residue.

3. The process of depressing the volatility of a fluorine compound which is soluble in hydrochloric acid and which is contained as an impurity in a mixture of HCl and a smaller proportion of said fluorine compound to effect separation of HCl from said compound which process comprises heating said mixture in a treatment zone, while in the presence of a depressant agent in solution in aqueous hydrochloric acid liquor, to temperature high enough to effect volatilization of HCl from the liquor in said treatment zone, said depressant agent being material of the group consisting of aluminum chloride and aluminum-chloride-fluoride complex and being present in amount equivalent to a soluble aluminum to soluble fluorine weight ratio of not less than about one soluble aluminum to one of all soluble fluorine present, to effect retention of fluorine of said fluorine compound in association with aluminum in unvolatilized liquid residue.

4. The process of claim 3 in which the Al/F weight ratio is not less than about two soluble aluminum to one of all soluble fluorine present.

5. The process of claim 3 in which the said mixture is heated to temperature not less than about 180° F. at substantially atmospheric pressure.

6. The process of depressing the volatility of a fluorine compound which is soluble in hydrochloric acid and which is contained as an impurity in a mixture of HCl and a smaller proportion of said fluorine compound to effect separation of HCl from said compound which process comprises heating said mixture in a treatment zone, while in the presence of a depressant agent in solution in aqueous hydrochloric acid liquor, to temperature high enough to effect volatilization of HCl from the liquor in said treatment zone, said depressant agent being material of the group consisting of aluminum chloride and aluminum-chloride-fluoride complex and said solution having an HCl strength in the range of about 18–33%, and during said heating maintaining said agent present in said solution in amount equivalent to a soluble aluminum to soluble fluorine weight ratio of not less than one soluble aluminum to one of all soluble fluoride present, but not in excess of an equivalent aluminum value descreasing substantially proportionaly from about 2.4% for about 18% HCl solution strength to about 0.4% for about 33% HCl solution strength, to effect retention of fluorine of said fluorine compound in association with aluminum in unvolatilized liquid residue.

7. The process of depressing the volatility of a fluorine compound which is soluble in hydrochloric acid and which is contained as an impurity in a gaseous mixture of HCl and a smaller proportion of said fluorine compound to effect separation of HCl from said compound which process comprises contacting said gas mixture with an aqueous hydrochloric acid liquor containing a depressant agent in solution therein, conducting said contacting operation to effect volatilization of HCl from said hydrochloric acid liquor, said depressant agent being material of the group consisting of aluminum chloride and aluminum-chloride-fluoride complex and being in amount sufficient to effect retention of a substantial amount of fluorine of said fluorine compound in association with aluminum in unvolatilized liquid residue.

8. The process of separating HCl from a fluorine compound which is soluble in hydrochloric acid and which is contained as an impurity in aqueous hydrochloric acid liquor comprising HCl and a smaller proportion of said fluorine compound which process comprises distilling said liquor while in the presence of a fluorine depressant agent of the group consisting of aluminum chloride and aluminum-chloride-fluoride complex, said agent being present in amount sufficient to effect retention of a substantial amount of fluorine of said fluorine compound in association with aluminum in unvolatilized liquid residue.

9. The process of separating HCl from a fluorine compound which is soluble in hydrochloric acid and which is contained as an impurity in an aqueous hydrochloric acid liquor comprising HCl and a smaller proportion of said fluorine compound which process comprises distilling said liquor while in the presence of a fluorine depressant agent of the group consisting of aluminum chloride and aluminum-chloride-fluoride complex, said agent being present in amount equivalent to a soluble aluminum to soluble fluorine weight ratio of not less than one soluble aluminum to one of all soluble fluorine present, to effect retention of fluorine of said fluorine compound in association with aluminum in unvolatilized liquid residue.

10. The process of claim 9 in which the Al/F weight ratio is not less than about two soluble aluminum to one of all soluble fluorine present.

11. The process of claim 8 in which distillation is carried out so that the said liquor is heated to temperature not less than about 180° F. at substantially atmospheric pressure.

12. The process of separating HCl from a fluorine compound which is soluble in hydrochloric acid and which is contained as an impurity in an aqueous hydrochloric acid liquor comprising HCl and a smaller proportion of said fluorine compound which process comprises continuously distilling said liquor while in the presence of a fluorine depressant agent; said agent being material of the group consisting of aluminum chloride and aluminum-chloride-fluoride complex, and said solution having an HCl strength in the range of about 18–33%, and during said distillation maintaining said agent present in said solution in amount equivalent to a soluble aluminum to soluble fluorine weight ratio of not less than one soluble aluminum to one of all soluble fluorine present, but not in excess of an equivalent aluminum value decreasing substantially proportionally from about 2.4% for about 18% HCl solution strength to about 0.4% for about 33% HCl solution strength, to effect retention of fluorine of said fluorine compound in association with aluminum in unvolatilized liquor residue.

13. The process of claim 12 in which the Al/F weight ratio is not less than two soluble aluminum to one of all soluble fluorine present, and the said distillation is carried out so that the said liquor is heated to temperature not less than about 180° F. at substantially atmospheric pressure.

14. A process for making hydrochloric acid which comprises forming an aqueous hydrochloric acid solution containing as impurity soluble fluorine compound in amount equivalent to much in excess of 300 p.p.m. of fluorine (basis, 100% HCl), said solution (1) having an HCl strength in the range of about 18–33%, (2) containing a fluorine depressant agent, of the group consisting of aluminum chloride and aluminum-chloride-fluoride complex, in amount equivalent to a soluble aluminum to soluble fluorine weight ratio of not less than about one soluble aluminum to one of all soluble fluorine present, (3) and having said depressant agent content not in excess of an equivalent aluminum value decreasing substantially proportionally from about 2.4% for about 18% HCl solution strength to about 0.4% for about 33% HCl solution strength; and subjecting said solution to distillation to remove as distillate hydrochloric acid containing less than 300 p.p.m. of fluorine (basis, 100% HCl).

15. A process for making hydrochloric acid which comprises forming an aqueous hydrochloric acid solution containing as impurity soluble fluorine compound in amount equivalent to much in excess of 60 p.p.m. of fluorine (basis, 100% HCl), said solution (1) having an HCl strength in the range of about 18–33%, (2) containing a fluorine depressant agent, of the group consisting of aluminum chloride and aluminum-chloride-fluoride complex, in amount equivalent to a soluble aluminum to soluble fluorine weight ratio of not less than about two soluble aluminum to one of all soluble fluorine present, (3) and having said depressant agent content not in excess of an equivalent aluminum value decreasing substantially proportionally from about 2.4% for about 18% HCl solution strength to about 0.4% for about 33% HCl solution strength; subjecting said solution to distillation under conditions such that the material in the distillation zone is maintained at temperature in the range of about 180–225° F. at substantially atmospheric pressure, and such that there is recovered as distillate substantially anhydrous HCl containing not more than about 60 p.p.m. of fluorine (basis, 100% HCl).

16. The process for separating hydrogen chloride from a fluorine compound which is soluble in hydrochloric acid and which is contained as an impurity in a gaseous mixture of hydrogen chloride and a smaller proportion of said fluorine compound to effect separation of hydrogen chloride from said compound which process comprises contacting said gaseous mixture with a saturated solution of hydrochloric acid containing aluminum chloride in solution therein, conducting said contacting operation to effect volatilization of hydrogen chloride from said hydrochloric acid solution, said aluminum chloride being in an amount sufficient to effect retention of a substantial amount of said fluorine compound in association with aluminum in the unvolatilized solution residue.

17. The process for separating hydrogen chloride from a fluorine compound which is soluble in hydrochloric acid and present as an impurity in a mixture comprising hydrogen chloride and a smaller proportion of said fluorine compound, which process comprises subjecting said mixture to the action of an aqueous hydrochloric acid solution of a depressant agent of the group consisting of aluminum chloride and aluminum-chloride-fluoride complex, said agent being present in amount sufficient to retain a substantial amount of fluorine of said compound in association with aluminum in said aqueous hydrochloric acid solution, and separating hydrogen chloride in gaseous form from said aqueous hydrochloric acid solution containing the retained fluorine associated with aluminum.

References Cited in the file of this patent

UNITED STATES PATENTS 2,389,457    Pines et al. _____ Nov. 20, 1945